Oct. 21, 1958  J. D. EDEN  2,857,043
ADJUSTABLE CASE CONVEYOR
Filed Aug. 31, 1954
Fig. 1.
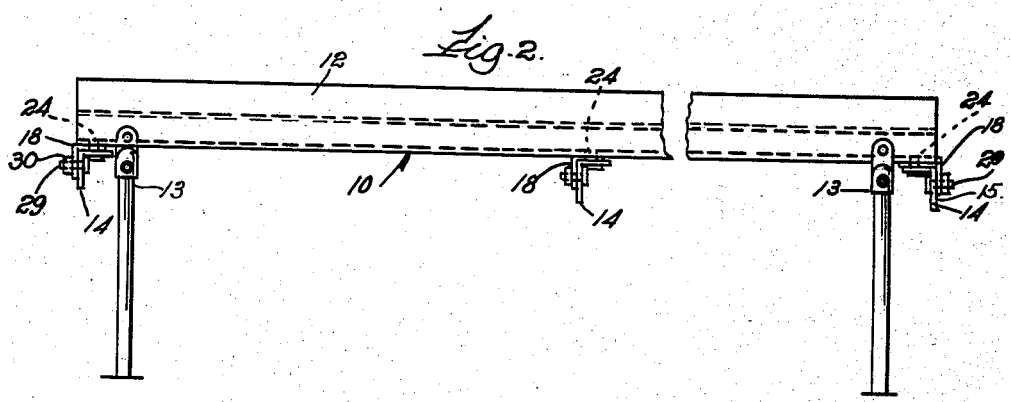
Fig. 2.
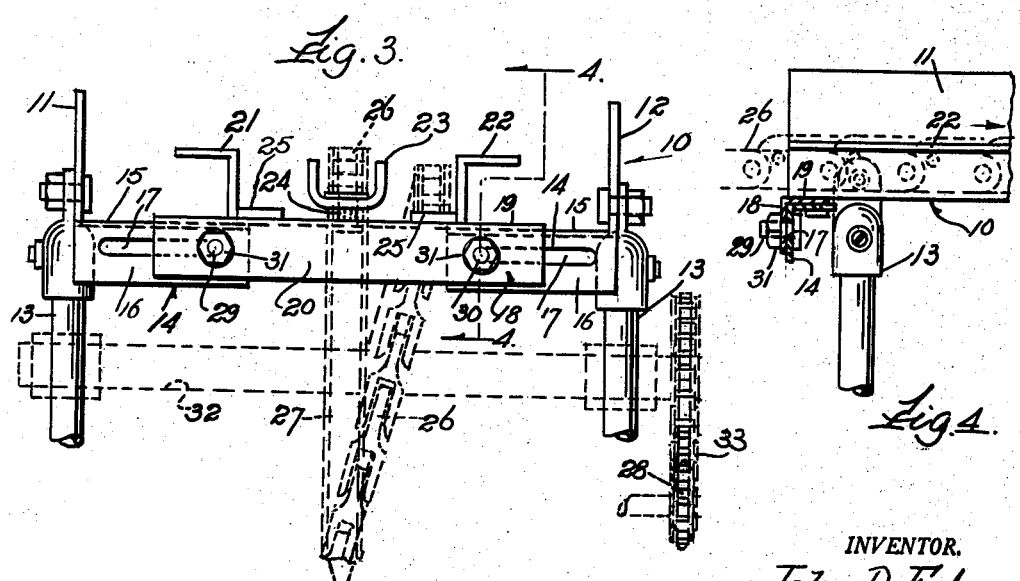
Fig. 3.
Fig. 4.
INVENTOR.
John D. Eden.
BY
James R. McKnight
Attorney.

2,857,043
ADJUSTABLE CASE CONVEYOR

John D. Eden, Chicago, Ill., assignor to M & C Conveyors, Inc., Chicago, Ill., a corporation of Illinois Application August 31, 1954, Serial No. 453,348

1 Claim. (Cl. 198—204)

My invention relates to a conveyor adapted to convey milk bottle cases, packages, or cartons, said conveyor being adjustable as to width.

It is apparent in recent years that the manufacturers of milk bottle cases have had no regard for conveyor systems on which the cases are going to operate in the plants. The designs of the cases, principally in width, have varied so much that at the present time it is impossible to standardize on a conveyor which will handle all size cases, and the customers when they buy these cases blame the conveyor manufacturers rather than the case manufacturers. Practically all plants are equipped with conveyors, and when new crates are purchased many times the conveyors have to be widened, or made narrower to handle them, and this is a very expensive and troublesome job.

Among the objects of my invention is to solve the foregoing problems, and to provide a conveyor which is adjustable even after installation to accommodate wider or narrower cases or other similar objects.

My invention also contemplates such other objects, advantages, and capabilities as will later more fully appear and which are inherently possessed by my invention.

While I have shown in the accompanying drawings, a preferred form of my invention, yet I wish it understood that the same is susceptible of modification and change without departing from the spirit of my invention.

Referring to the drawings, Fig. 1 is a top plan view of my adjustable case conveyor; Fig. 2 is a side elevation thereof; Fig. 3 is an enlarged view of the end portion, with the chain drive in dotted outline; and Fig. 4 is a detailed sectional view on line 4—4 of Fig. 3.

The embodiment selected to illustrate my invention comprises a conveyor 10 having a pair of spaced side rails 11 and 12, each bolted or otherwise suitably attached to an upright 13, the lower end of which rests on the floor. Each side rail has at each end an inwardly extending angle member 14 having a flat top portion 15 and a downwardly extending portion 16 with a slot 17 therein.

At each end of conveyor 10 is a central angle member 18 having a flat top portion 19 resting on top portions 15 of opposite angle members 14 of side rails 11 and 12, and a downwardly extending portion 20 contacting portions 16 of opposite angle members 14 of side rails 11 and 12.

Spaced tracks 21 and 22 extend between angle members 18 at each end of conveyor 10 and are welded to the top portions 19 of said angle members. A central U-shaped member 23 extends parallel to said tracks and is welded at each of its opposite ends to a height member 24 attached to the center of top portions of angle member 18 at each end of conveyor 10. This raises central member 23 above return member 25 which is welded to top portions 19 of angle members 18 at each end of conveyor 10. A chain 26 moves in U-shaped member 23 and returns on return member 25; chain 26 is moved by sprocket 27 through shaft 32, which in turn is driven by chain 33 moved by sprocket 28 connected to a suitable source of electrical or other power.

A pair of spaced bolts 29 and 30 extend through central angle member 18. One of these spaced bolts extend through slot 17 of angle member 14 of side rail 11, and the other bolt extends through slot 17 of angle member 14 of side rail 12.

The width of the conveyor 10 may be determined by side movement of the side rails within the limits of the slots 17. When the bolts are in the innermost position in the slots, the conveyor is widest, and when the bolts are in the outermost position in the slots, the conveyor is narrowest. Positions in between may be chosen. When a position is chosen a nut 31 is turned on each of bolts 29 and 30 to hold them in said position. Adjustment of width may be made at any time.

When my conveyor is of such length that intermediate cross members are desired, such cross members may have the following construction. Each side rail has welded thereto intermediate inwardly extending angle members 14 the same as end angle members 14, with similar slots 17. Said intermediate angle members contact a corresponding central intermediate angle member 18. Bolts 29 and 30 extend through intermediate angle members 14 and slots 17. After adjustment for width is made the same as at the ends, nuts 31 are applied to hold the conveyor in said position until other adjustment is desired.

Having thus described my invention, I claim:

An adjustable case conveyor for milk bottle cases comprising a pair of spaced central angle members positioned at opposite ends of the conveyor, a pair of spaced tracks extending between and attached to said spaced central angle members, a pair of chain guides in the form of a U-shaped member and a return member attached to said spaced central angle members, a chain movable in and between said chain guides, sprocket means engaging said chain and to a source of electrical power for moving said chain, a plurality of floor supports, a pair of spaced case guide rails mounted on top of said supports, each of said guide rails having at each end an inwardly extending angle with a flat top portion and a downwardly extending portion with a slot therethrough, each of said central angle members having a flat top portion and a downwardly extending portion, the flat top portion of the central angle members resting on top of the flat top portions of spaced guide rails, and the downwardly extending portion of the central members contacting the downwardly extending portions of spaced guide rails, each of said guide rails manually, quickly and independently movable with respect to said central angle members for varying the width of the conveyor between said guide rails for its entire length to accommodate milk bottle cases of varying width without any attention to the tracks, chain guides and chain, and a pair of spaced bolts extending through each of said central angle members and into a slot of one of said guide rails and nuts for engaging said bolts for holding the conveyor in chosen position.

References Cited in the file of this patent

UNITED STATES PATENTS

| | | |
|---|---|---|
| 635,177 | McCabe | Oct. 17, 1899 |
| 1,055,386 | Carpenter | Mar. 11, 1913 |
| 2,247,672 | Thum | July 1, 1941 |
| 2,253,761 | Campbell | Aug. 26, 1941 |